(12) United States Patent
Dai et al.

(10) Patent No.: US 10,185,137 B2
(45) Date of Patent: Jan. 22, 2019

(54) WAVELENGTH MULTIPLEXED FOURIER PTYCHOGRAPHIC MICROSCOPY SYSTEM AND METHOD

(71) Applicant: Tsinghua University, Beijing (CN)

(72) Inventors: Qionghai Dai, Beijing (CN); You Zhou, Beijing (CN); Jiamin Wu, Beijing (CN); Jingtao Fan, Beijing (CN)

(73) Assignee: Tsinghua University, Beijing (CN)

( * ) Notice: Subject to any disclaimer, the term of this patent is extended or adjusted under 35 U.S.C. 154(b) by 92 days.

(21) Appl. No.: 15/490,313

(22) Filed: Apr. 18, 2017

(65) Prior Publication Data

US 2018/0231761 A1 Aug. 16, 2018

(30) Foreign Application Priority Data

Feb. 13, 2017 (CN) .......................... 2017 1 0076930

(51) Int. Cl.
| | |
|---|---|
| *H04N 9/47* | (2006.01) |
| *G02B 21/36* | (2006.01) |
| *H04N 5/225* | (2006.01) |
| *H04N 5/235* | (2006.01) |
| *H04N 9/04* | (2006.01) |
| *H04N 5/232* | (2006.01) |
| *H04N 9/64* | (2006.01) |
| *G02B 21/06* | (2006.01) |
| *G02B 13/00* | (2006.01) |

(52) U.S. Cl.
CPC ....... *G02B 21/367* (2013.01); *G02B 13/0095* (2013.01); *G02B 21/06* (2013.01); *G02B 21/361* (2013.01); *H04N 5/2256* (2013.01); *H04N 5/2354* (2013.01); *H04N 5/23232* (2013.01); *H04N 9/04* (2013.01); *H04N 9/64* (2013.01)

(58) Field of Classification Search
CPC .. G02B 21/367; G02B 13/0095; G02B 21/06; G02B 21/361; H04N 5/2256; H04N 5/2354; H04N 9/04; H04N 9/64; H04N 5/23232
USPC ....... 348/79, 77, 80; 386/223, 224, 227, 230
See application file for complete search history.

(56) References Cited

U.S. PATENT DOCUMENTS

| | | | |
|---|---|---|---|
| 2013/0100333 A1* | 4/2013 | Awatsuji | G03H 1/0443 348/335 |
| 2014/0085715 A1* | 3/2014 | Popescu | G02B 21/0056 359/385 |

* cited by examiner

*Primary Examiner* — Robert Chevalier
(74) *Attorney, Agent, or Firm* — David D. Brush; Westman, Champlin & Koehler, P.A.

(57) ABSTRACT

The present disclosure relates to Fourier ptychographic microscopy systems and methods. The system includes: a three-color LED array; a microscope, configured to obtain image information with multi-wavelength, and magnify to generate magnified image information; an RGB camera configured to acquire a first color image with a first resolution based on the magnified image information; and a controller, configured to synchronously control the three-color LED array and the RGB camera, in which the three-color LED array is further configured to display a plurality of illumination patterns, the RGB camera is further configured to acquire synchronously a plurality of first color images, and the controller is further configured to restore a single second image with a second resolution according to the plurality of first color images, and the first resolution is less than the second resolution. The present disclosure improves sampling speed.

11 Claims, 2 Drawing Sheets

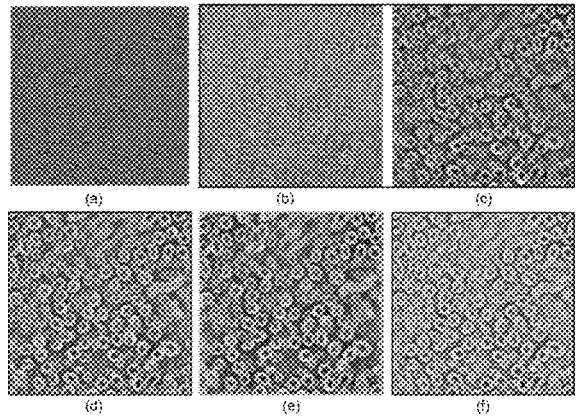

Fig. 3

| | S1 |
|---|---|
| a lateral relative position and an axial distance between the three-color LED array and a microscopic objective lens of the microscope are adjusted, to make multi-wavelength incident light generated by the three-color LED array correspond to multi-angle incident light required | |

| | S2 |
|---|---|
| the image information with multi-wavelength generated by illuminating the sample with the multi-wavelength incident light is obtained by the microscopic objective lens and a tube lens of the microscope, and the image information is magnified by the microscopic objective lens and the tube lens to generate the magnified image information at the image plane of the tube lens | |

| | S3 |
|---|---|
| the first color images of the sample illuminated by the multi-wavelength incident light are collected by the RGB camera | |

| | S4 |
|---|---|
| the three-color LED array and the RGB camera are synchronously controlled by the controller, and a plurality of first color images is acquired by changing a plurality of corresponding illumination patterns of the three-color LED | |

| | S5 |
|---|---|
| the plurality of first color images is split according to R/G/B channels of the RGB camera, to obtain a plurality of split data | |

| | S6 |
|---|---|
| iteration recovery and Fourier ptychography are performed to the plurality of split data, to obtain the raw image data required for restoring the single high-resolution image and phase of the sample | |

Fig. 4

WAVELENGTH MULTIPLEXED FOURIER PTYCHOGRAPHIC MICROSCOPY SYSTEM AND METHOD

CROSS-REFERENCE TO RELATED APPLICATIONS

This Application claims priority to and the benefit of Chinese Application No. 201710076930.9, filed Feb. 13, 2017, the content of which is incorporated herein by reference in its entirety.

FIELD

The present disclosure relates to microscopy imaging technology field, and more particularly to a wavelength multiplexed Fourier ptychographic microscopy system and method.

BACKGROUND

In FPM (Fourier ptychographic microscopy) system, an ordinary microscope light source is replaced by a programmable LED array, thus introducing illuminating with multiple angles of coherent lights into the conventional microscopy system, and realizing imaging with wide field of view and high resolution. In data collection process, LED light sources with different incident angles are lit up sequentially, and a plurality of low-resolution images of a sample illuminated by a corresponding light is simultaneously collected. Each collected low resolution image contains information of the sample illuminated by different angle of light, that is, it contains different frequency spectrum information of the sample. Therefore, a phase retrieval algorithm may be used to stitch information contained in these images on a spatial frequency domain (namely Fourier domain), to obtain a complex amplitude image with a high resolution of the sample (namely an intensity image and a phase image of the sample). With the FPM method, images of one billion pixels of the sample can be obtained without mechanical scanning, greatly broadening spatial bandwidth product (SBP for short) of a microscope objective lens, thus increasing optical information throughput of the microscopy system.

However, one limitation of the FPM method is that the data collection process takes a long time. To some extent, the FPM method can be regarded as a method that obtains high spatial resolution by sacrificing temporal resolution. A prototype system of the FPM method uses the above sequential illumination strategy, in which several minutes may be taken to collect more than 200 original low-resolution images, so as to restore the complex amplitude image with high resolution of the sample. This limitation makes dynamic activity of the sample unable to be observed with the FPM system, which limits application in biological imaging of the FPM system.

SUMMARY

A wavelength multiplexed Fourier ptychographic microscopy system is provided in embodiments of the present disclosure, including: a three-color LED array; a microscope, configured to obtain image information with multi-wavelength generated by illuminating a sample with the three-color LED array, and to magnify the image information to generate magnified image information; an RGB camera, disposed on an image plane of the microscope, and configured to acquire a first color image with a first resolution based on the magnified image information; and a controller, configured to synchronously control the three-color LED array and the RGB camera, in which the three-color LED array is further configured to be controlled to display a plurality of illumination patterns, the RGB camera is further configured to acquire synchronously a plurality of first color images based on the magnified image information corresponding to the plurality of illumination patterns, and the controller is further configured to restore a single second image with a second resolution according to the plurality of first color images, and the first resolution is less than the second resolution, the second image includes intensity and phase information corresponding to the second resolution of the sample.

In an embodiment, the three-color LED array includes red LEDs, green LEDs, and blue LEDs.

In an embodiment, the red LEDs, the green LEDs, and the blue LEDs are non-overlapping with each other in a spectral dimension.

In an embodiment, the microscope includes: a microscopic objective lens, configured to magnify the image information generated by illuminating the sample with the three-color LED array with a certain magnification to generate the magnified image information; and a tube lens, configured to image the magnified image information to the RGB camera.

In an embodiment, a sampling resolution of the RGB camera matches an optical resolution of an imaging system of the microscope.

In an embodiment, the RGB camera is further configured to acquire the first color image based on the magnified image information with a Bayer color filter.

A wavelength multiplexed Fourier ptychographic microscopy method is provided in embodiments of the present disclosure, applied in the system according to any one of the above embodiments, including: adjusting a lateral relative position and an axial distance between the three-color LED array and a microscopic objective lens of the microscope, to make multi-wavelength incident light generated by the three-color LED array correspond to multi-angle incident light required; obtaining, by the microscopic objective lens and a tube lens of the microscope, the image information with multi-wavelength generated by illuminating the sample with the multi-wavelength incident light, and magnifying, by the microscopic objective lens and the tube lens, the image information, to generate the magnified image information at the image plane of the tube lens; acquiring, by the RGB camera, the first color images of the sample illuminated by the multi-wavelength incident light; synchronously controlling, by the controller, the three-color LED array and the RGB camera, and acquiring a plurality of first color images by changing a plurality of corresponding illumination patterns of the three-color LED array; splitting the plurality of first color images according R/G/B channels of the RGB camera, to obtain a plurality of split data; and performing iteration recovery and Fourier ptychography to the plurality of split data, to obtain the single second image.

In an embodiment, a distance between the three-color LED array and the sample is 1 to 10 centimeters.

In an embodiment, the distance between the three-color LED array and the sample is 8 centimeter.

In an embodiment, the sample is colorless transparent or translucent.

In an embodiment, before an act of performing iteration recovery and Fourier ptychography to the plurality of split data, to obtain the single second image, the method further includes: performing preprocessing to the plurality of split data, wherein the preprocessing comprises contrast balance, parameter calculation, and chromatic defocus calibration.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which:

FIG. 3 is a schematic diagram for recovering a high-resolution image and phase according to collected low-resolution images of a mouse kidney cell sample according to an embodiment of the present disclosure; and FIG. 4 is a flow chart of a wavelength multiplexed Fourier ptychographic microscopy method according to an embodiment of the present disclosure.

DETAILED DESCRIPTION

Figure 1:
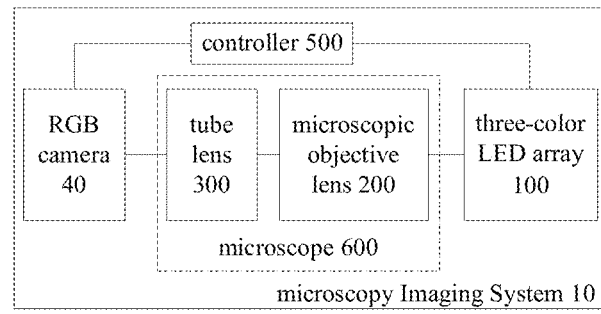
FIG. 1 is a block diagram of a wavelength multiplexed Fourier ptychographic microscopy system according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the description of the present disclosure, it should be understood that terms such as "central," "longitudinal," "lateral," "upper," "lower," "front," "rear," "left," "right," "vertical," "horizontal," "top," "bottom," "inner," and "outer," should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Embodiments of the present disclosure will be described with reference to the drawings.

Wavelength multiplexing technology has been used in the field of information transmission for a long time, more particularly in optical fiber communication and an endoscope system. In addition, the wavelength multiplexing technology is also used to realize ultrafast optical imaging. Lights with different wavelengths can independently go through optical fibers and other optical devices, therefore the wavelength multiplexing technology can greatly enhancing information transmitting ability of the system.

Figure 2:
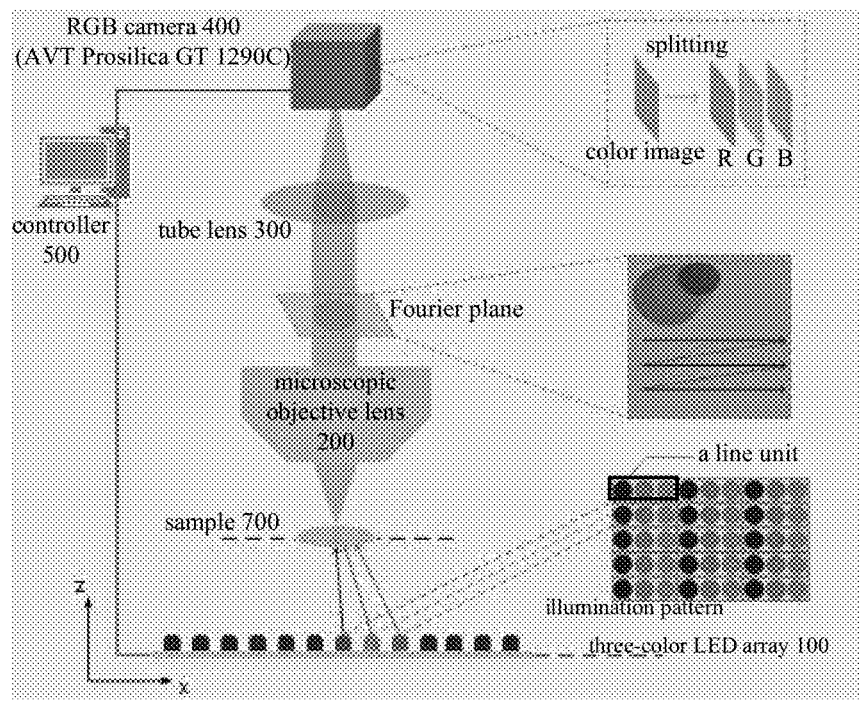
FIG. 2 is a schematic diagram of a wavelength multiplexed Fourier ptychographic microscopy system according to an embodiment of the present disclosure.

FIG. 1 is a block diagram of a wavelength multiplexed Fourier ptychographic microscopy system according to an embodiment of the present disclosure. FIG. 2 is a schematic diagram of a wavelength multiplexed Fourier ptychographic microscopy system according to an embodiment of the present disclosure.

As shown in FIG. 1 and FIG. 2, the wavelength multiplexed Fourier ptychographic microscopy system according to an embodiment of the present disclosure includes a three-color LED array 100, a microscope 600, an RGB camera 400, and a controller 500.

In an embodiment of the present disclosure, the microscope 600 includes a microscopic objective lens 200 and a tube lens 300.

In an embodiment of the present disclosure, the three-color LED array 100 may generate three wavelengths of light corresponding to red, green and blue respectively. The three-color LED array 100 is configured to illuminate the sample instead of a wide-field light source of an ordinary microscope. The three-color LED array 100 is different from a single-color LED array used in the prototype system of the FPM, thus realizing an expansion of the MFPM (multiplexed FPM) technology in the related art from a spatial frequency dimension to a spectral dimension.

The microscope 600 magnifies an image of a microscopic sample illuminated by the three wavelengths of light, such that a magnified image can be generated on an image plane of the microscope 600 through a camera outlet.

The RGB camera 400 is disposed on the image plane behind the camera outlet of the microscope 600. The RGB camera 400 is configured to collect color images of the sample illuminated by the three wavelengths of light.

The controller 500 is connected to both the three-color LED array 100 and the RGB camera 400, configured to synchronously control the three-color LED array 100 and the RGB camera 400, to quickly collect a plurality of wavelength multiplexed color images with low-resolution (i.e. the plurality of first color images with a first resolution), that is, to obtain raw image data required for recovering a single frame image with high resolution (i.e. the second image with a second resolution). In an embodiment of the present disclosure, the raw image data can be gray images, obtained by simple split from color images based on R/G/B channels.

In an embodiment of the present disclosure, the controller 500 synchronously controls the three-color LED array 100 and the RGB camera 400. While controlling the three-color LED array 100 to generate a multi-wavelength illumination pattern, the controller 500 also controls the camera 400 to collect a corresponding low-resolution image of the sample. Each collected image corresponds to three areas of the Fourier plane marked by different wavelengths. Therefore, one time of image collection in the present disclosure is equivalent to multiple times of image collection in the related art.

In an embodiment of the present disclosure, center wavelengths of the red LEDs, the green LEDs, and the blue LEDs are 632 nm, 532 nm, and 440 nm respectively. Each of the three has a narrow-band spectrum of 20 nm, thus the red LEDs, the green LEDs, and the blue LEDs are non-overlapping with each other in the spectral dimension.

In an embodiment of the present disclosure, arrangements and settings of LEDs in the three-color LED array 100 can be designed in advance, and illumination patterns of the three-color LED array 100 can be controlled by programing. Each LED has a different spatial position and a different color, thus providing an incident light with a certain angle and a certain wavelength.

In an embodiment of the present disclosure, a sampling resolution of the RGB camera 400 matches an optical resolution of the microscope 600, that is, the relationship of the two satisfy Nyquist Sampling Theorem.

In an embodiment of the present disclosure, the RGB camera 400 collects the magnified image information with a Bayer color filter. The LEDs of different colors have no overlap in the spectral dimension, and the RGB camera 400 has almost discrete responses to these different color illuminations. Thus the wavelength multiplexed information is naturally separable by R/G/B channels.

In an embodiment of the present disclosure, a distance between the three-color LED array 100 and the sample 700 is 1 to 10 centimeters, and the light from the three-color LED array 100 can be regarded as a parallel light illumination. In a preferable embodiment of the present disclosure, the distance between the three-color LED array 100 and the sample 700 is 8 centimeter. Different wavelengths of light are narrow-band in the spectral domain, and each illumination can be regarded as a superposition of a plurality of discrete single-color lights, that is, a superposition of a finite number of coherent lights, therefore, the system is still a coherent optical system.

In order to make those skilled in the art further understand the present disclosure, embodiments of the present disclosure will be described in detail.

For the convenience of building a prototype system, a commercial wide-field microscope (such as Zeiss Observer Z1) can be used for magnifying the image information of the microscopic sample 700 into the image plane of the microscope 600 according to an embodiment of the present disclosure. The three-color LED array 100 with three wavelengths is used to illuminate the sample 700 according to the corresponding illumination pattern, and a suitable RGB camera 400 (such as VT Prosilica GT1290C) is used for data collection. Because center wavelengths of the three kinds of LED light are different, 632 nm for the red LEDs, 532 nm for the green LEDs, and 440 nm for the blue LEDs, defocusing shifts of the three kinds of LED light caused by propagating in the system are 20 um, 40 um, 80 um (um means micrometer) respectively. Corresponding phase shifting factors are calculated according to the defocusing shifts respectively. The calculated phase shifting factors are brought into a rebuilding algorithm, to rebuild an image with high resolution. In an embodiment of the present disclosure, 75 RGB images with low resolution are collected for rebuilding a complex amplitude image of the sample.

A group of suitable illumination patterns can be designed in advance. In practical experiments, the illumination patterns designed in advance of the three-color LED array 100 can be lit up in turn by programming control, to illuminate a certain region of the Fourier plane of the sample, until image information of the whole Fourier plane of the sample are collected.

Three LEDs, colors of which are red, green, and blue respectively, in a line unit (different from an illumination unit of the three-color LED array 100) are lit up each time. The three LEDs in the line unit (as shown in FIG. 2.) are at three adjacent positions in horizontal direction of the three-color LED array 100. According to a pre-designed line pattern, this process is repeated for each line unit from upper left to lower right of the three-color LED array 100, that is, line units are lit up in turn according to an order of the line pattern. The RGB camera 400 is used to collect images generated by the sample illuminated by the line units in turn, until all the line units in the three-color LED array 100 are lit up once. That is, all useful information of the Fourier plane of the sample is collected.

Because the multiple wavelengths of light are used, the collected data cannot be directly used in rebuilding process, and the collected data corresponding to the multiple wavelengths of light may be split according to R/G/B channels. Wavelength-related parameters setting is also needed. Specifically, the collected data can be applied to the rebuilding algorithm after contrast balance, parameters calculation, and chromatic defocus calibration are performed, which includes followings.

1. Wavelength Multiplexed Image Information Splitting

Referring to FIG. 2, when a line unit is lit up under the line pattern, a collected image can include multiplexed information corresponding to three wavelengths. The multiplexed information corresponding to the three wavelengths represents information of three areas of the Fourier plane, which also corresponds to three illumination angles. The three spectral frequency bands of signal multiplexed in a collected image can be regarded to be collected by three channels, R/G/B, respectively, because the lights of the LEDs have a character of narrow band, and responses of the RGB camera to each wavelength are separate. Data of R/G/B channels in a single color image can be directly split into three gray images. Therefore 75 collected RGB images are split into 225 gray images, including 75 gray images of the sample for each of the red light, the green light and the blue light.

2. Contrast Balance

There are contrast differences between data of the R/G/B channels, because transmissivity of different wavelengths of light varies when the different wavelengths of light pass through the sample, and there are also differences in brightness between the responses of the RGB camera to the different wavelengths of light. Relative brightness adjusting or contrast balance between the three channels may be necessary. The relative brightness adjusting or contrast balance can be realized by normalizing the data of each channel, that is by adjusting the value of the data of each channel to the range of 0-1.

3. Chromatic Defocus Calibration

In an embodiment of the present disclosure, a multi-color illumination framework is used in chromatic defocus calibration.

Due to the different propagation speed of three wavelengths in lens or other mediums, the images of the three wavelengths cannot be all in focus simultaneously. When collecting images in an experiment, defocusing shifts for different lights can be estimated and recorded. Different phase shifting factors related to the wavelength are calculated according to the defocusing shifts. The phase shifting factors are then brought into the rebuilding algorithm in rebuilding process to eliminate the effect of the chromatic defocus. A function of the phase shifting factor is as following.

$$e^{i\cdot\varphi(k_x,k_y)} = e^{i\sqrt{(2\pi/\lambda)^2-k_x^2-k_y^2}\cdot z_0},$$

in which, $k_x^2+k_y^2<(NA_{obj}\cdot 2\pi/\lambda)^2$ ($k_x$, $k_y$) is a wave-vector of the oblique incident light, which is equivalent to the shift of the center of the sample's spectrum in the Fourier domain, $\lambda$ is a wavelength of a light, $NA_{obj}$ is a numerical aperture of the microscope object lens 200, and $z_0$ is an estimated defocus shift along the optical axis, e is an exponential function, i is an imaginary unit, $\varphi$ is a phase function, x, y are the coordinates in space domain, $k_x, k_y$ are the coordinates in Fourier domain corresponding to x direction and y direction respectively.

4. Parameter Calculating

Under the coherent illumination, an optical transfer function of the microscope object lens 200 can be regarded as a circular pupil function. Referring to FIG. 2, parameters such as a central position and a size (or radius) of each pupil are related to wavelength of the illumination light. Specifically, the radius of a pupil can be obtained according to following function.

$$NA_{obj}\times k_0,$$

in which, $k_0=2\pi/\lambda$, and $k_0$ is the wave number in vacuum.

The central position can be obtained according to following function.

$$(k_x^i, k_y^i) = \frac{2\pi}{\lambda}\left(\frac{x_c-x_i}{s}, \frac{y_c-y_i}{s}\right),$$

in which, $s=\sqrt{(x_c-x_i)^2+(y_c-y_i)^2+h^2}$, ($x_c$, $y_c$) is a central position of the image plane of the sample, ($x_i$, $y_1$) is a position of the $i^{th}$ LED, h is the distance between the three-color LED array 100 and the sample.

In rebuilding process, an optimized phase retrieval algorithm based on the embedded pupil function is used. Firstly, the mentioned wavelength multiplexed image information splitting and contrast balance are performed to the collected data. Then parameters related to wavelength and corresponding phase factors are applied to the rebuilding algorithm, to restore the complex amplitude image with high resolution of the sample. Finally, collection number and collection time of images are reduced to ⅓ of previous measurements, and further performance improvement can be realized by combining methods in the embodiments of the present disclosure with other multiplexed Fourier ptychographic microscopy method.

In an embodiment of the present disclosure, in order to ensure the sample information under multiple wavelengths of light correspond to that under multiple angles of light, the observed sample may satisfy some certain limitations. For example, information of the sample under different wavelengths of light almost needs to be the same except the wavelength-related resolution and defocus shifts, and there is no material dispersion of the sample. Therefore, in an embodiment of the present disclosure, the observed sample can be colorless, transparent or translucent. Generally, almost all the thin phase objects satisfy this requirement, thus there are many suitable applications for the wavelength multiplexed Fourier ptychographic microscopy system according to the embodiments of the present disclosure.

A wavelength multiplexed Fourier ptychographic microscopy method is provided in embodiments of the present disclosure. FIG. 4 is a flow chart of a wavelength multiplexed Fourier ptychographic microscopy method according to an embodiment of the present disclosure. As shown in FIG. 4, the wavelength multiplexed Fourier ptychographic microscopy method according to an embodiment of the present disclosure includes followings.

In block S1, a lateral relative position and an axial distance between the three-color LED array and a microscopic objective lens of the microscope are adjusted, to make multi-wavelength incident light generated by the three-color LED array correspond to multi-angle incident light required.

In block S2, the image information with multi-wavelength generated by illuminating the sample with the multi-wavelength incident light is obtained by the microscopic objective lens and a tube lens of the microscope, and the image information is magnified by the microscopic objective lens and the tube lens to generate the magnified image information at the image plane of the tube lens.

In block S3, the first color images of the sample illuminated by the multi-wavelength incident light are collected by the RGB camera.

In block S4, the three-color LED array and the RGB camera are synchronously controlled by the controller, and a plurality of first color images is acquired by changing a plurality of corresponding illumination patterns of the three-color LED.

In block S5, the plurality of first color images is split according to R/G/B channels of the RGB camera, to obtain a plurality of split data.

In block S6, iteration recovery and Fourier ptychography are performed to the plurality of split data, to obtain the raw image data required for restoring the single high-resolution image and phase of the sample.

In an embodiment of the present disclosure, a distance between the three-color LED array and the sample is 1 to 10 centimeters. In a preferable an embodiment of the present disclosure, a distance between the three-color LED array and the sample is 8 centimeter.

In an embodiment of the present disclosure, the sample is colorless transparent or translucent.

In an embodiment of the present disclosure, before block S6, the method further includes performing preprocessing to the plurality of split data, in which the preprocessing includes contrast balance, parameter calculation, and chromatic defocus calibration.

It should be noted that, specific implement manners of the wavelength multiplexed Fourier ptychographic microscopy method according to embodiments of the present disclosure is similar to that of the wavelength multiplexed Fourier ptychographic microscopy system according to an embodiment of the present disclosure, which can refer to descriptions in the system, and is not described in detail in order to reduce redundancy.

With the wavelength multiplexed Fourier ptychographic microscopy system and method according to the present disclosure, a simplified and representative prototype system is built to verify performance of the wavelength multiplexed Fourier ptychographic microscopy. In the simplified and representative prototype system, the programmable three-color (such as red, green and blue) LED array is taken as a lighting source, and the RGB camera is taken as a data collection device. The simplified architecture can be realized just by simply modifying he prototype system of the FPM in the related art, and can be compatible with most MFPM method in the related art, improving collecting speed for 3 times.

FIG. 3 is a schematic diagram for recovering a high-resolution image and phase according to collected low-resolution images of a mouse kidney cell sample according to an embodiment of the present disclosure.

Experiment results of the mouse kidney cells obtained with the wavelength multiplexed Fourier ptychographic microscopy method according to embodiments of the present disclosure is shown in FIG. 3. FIG. 3 (a) is a low-resolution gray image of the mouse kidney cells, FIG. 3 (b) is a recovered high-resolution intensity image of the mouse kidney cells. FIG. 3 (c) is a recovered high-resolution phase image of the mouse kidney cells. The intensity image just has a little outline information because the mouse kidney cells are transparent. FIG. 3 (d), FIG. 3 (e), and FIG. 3 (f) are recovered high-resolution images obtained under a red light, a green light, and a blue light respectively by a method in the related art. It can be seen from FIG. 3 that, to obtain similar results, collection time of the wavelength multiplexed Fourier ptychographic microscopy method according to embodiments of the present disclosure is just ⅓ of the methods in the related art.

In addition, other configurations and effects of the wavelength multiplexed Fourier ptychographic microscopy system according to the embodiments of the present disclosure are known to those skilled in the art, and are not described in order to reduce redundancy.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A wavelength multiplexed Fourier ptychographic microscopy system, comprising:
    a three-color LED array;
    a microscope, configured to obtain image information with multi-wavelength generated by illuminating a sample with the three-color LED array, and to magnify the image information to generate magnified image information;
    an RGB camera, disposed on an image plane of the microscope, and configured to acquire a first color image with a first resolution based on the magnified image information; and
    a controller, configured to synchronously control the three-color LED array and the RGB camera,
    wherein the three-color LED array is further configured to be controlled to display a plurality of illumination patterns, the RGB camera is further configured to acquire synchronously a plurality of first color images based on the magnified image information corresponding to the plurality of illumination patterns, and the controller is further configured to restore a single second image with a second resolution according to the plurality of first color images, and the first resolution is less than the second resolution, the second image comprises intensity and phase information corresponding to the second resolution of the sample.

2. The system according to claim 1, wherein, the three-color LED array comprises red LEDs, green LEDs, and blue LEDs.

3. The system according to claim 2, wherein the red LEDs, the green LEDs, and the blue LEDs are non-overlapping with each other in a spectral dimension.

4. The system according to claim 1, wherein the microscope comprises:
    a microscopic objective lens, configured to magnify the image information generated by illuminating the sample with the three-color LED array with a certain magnification to generate the magnified image information; and
    a tube lens, configured to image the magnified image information to the RGB camera.

5. The system according to claim 1, wherein a sampling resolution of the RGB camera matches an optical resolution of an imaging system of the microscope.

6. The system according to claim 5, wherein the RGB camera is further configured to acquire the first color image based on the magnified image information with a Bayer color filter.

7. A wavelength multiplexed Fourier ptychographic microscopy method, applied in a wavelength multiplexed Fourier ptychographic microscopy system, wherein
    the system comprises: a three-color LED array; a microscope, configured to obtain image information with multi-wavelength generated by illuminating a sample with the three-color LED array, and to magnify the image information to generate magnified image information; an RGB camera, disposed on an image plane of the microscope, and configured to acquire a first color image with a first resolution based on the magnified image information; and a controller, configured to synchronously control the three-color LED array and the RGB camera, in which the three-color LED array is further configured to be controlled to display a plurality of illumination patterns, the RGB camera is further configured to acquire synchronously a plurality of first color images based on the magnified image information corresponding to the plurality of illumination patterns, and the controller is further configured to restore a single second image with a second resolution according to the plurality of first color images, and the first resolution is less than the second resolution, the second image comprises intensity and phase information corresponding to the second resolution of the sample; and the method comprises:
    adjusting a lateral relative position and an axial distance between the three-color LED array and a microscopic objective lens of the microscope, to make multi-wavelength incident light generated by the three-color LED array correspond to multi-angle incident light required;

obtaining, by the microscopic objective lens and a tube lens of the microscope, the image information with multi-wavelength generated by illuminating the sample with the multi-wavelength incident light, and magnifying, by the microscopic objective lens and the tube lens, the image information, to generate the magnified image information at the image plane of the tube lens;

acquiring, by the RGB camera, the first color image of the sample illuminated by the multi-wavelength incident light;

synchronously controlling, by the controller, the three-color LED array and the RGB camera, and acquiring a plurality of first color images by changing a plurality of corresponding illumination patterns of the three-color LED array;

splitting the plurality of first color images according R/G/B channels of the RGB camera, to obtain a plurality of split data; and performing iteration recovery and Fourier ptychography to the plurality of split data, to obtain the single second image.

8. The method according to claim 7, wherein a distance between the three-color LED array and the sample is 1 to 10 centimeters.

9. The method according to claim 8, wherein the distance between the three-color LED array and the sample is 8 centimeter.

10. The method according to claim 7, wherein the sample is colorless transparent or translucent.

11. The method according to claim 7, before an act of performing iteration recovery and Fourier ptychography to the plurality of split data, to obtain the single second image, further comprising:

performing preprocessing to the plurality of split data, wherein the preprocessing comprises contrast balance, parameter calculation, and chromatic defocus calibration.

* * * * *